UNITED STATES PATENT OFFICE.

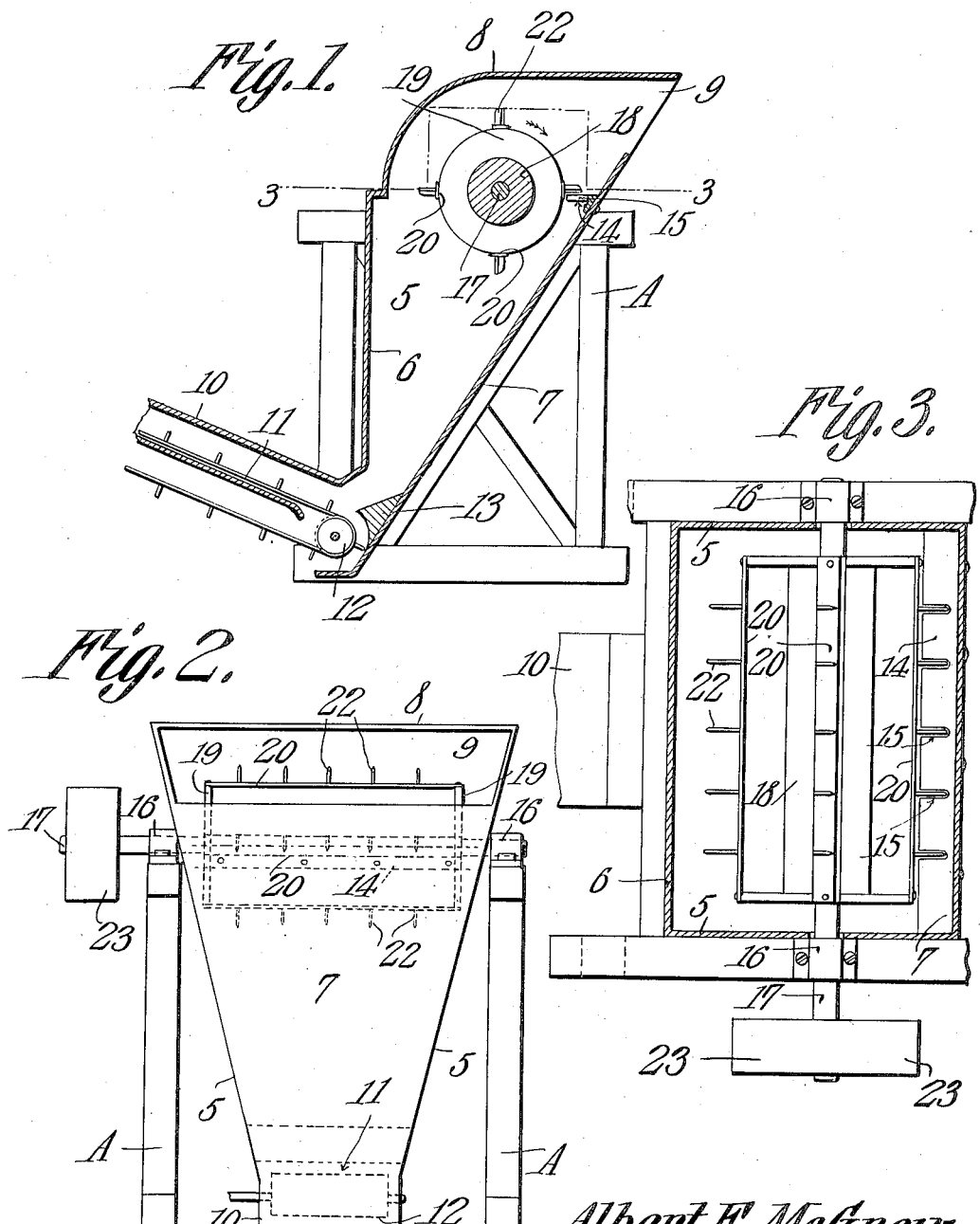

ALBERT E. McGREW, OF SCOTTSBURG, INDIANA.

VEGETABLE-CUTTER.

952,625.

Specification of Letters Patent. Patented Mar. 22, 1910.

Application filed November 30, 1908. Serial No. 465,007.

*To all whom it may concern:*

Be it known that I, ALBERT E. McGREW, a citizen of the United States, residing at Scottsburg, in the county of Scott and State of Indiana, have invented a new and useful Vegetable-Cutter, of which the following is a specification.

It is the object of the present invention to provide a vegetable cutter in which the vegetable to be cut will be chopped into pieces of regular size.

The cutter embodying the invention belongs, broadly speaking, to that class in which movable knives pass through slots in a stationary member, and it is the object of the invention to so relatively arrange the movable blades and fixed member that the vegetable to be cut will be chopped into pieces of equal and substantially regular size.

A further object of the invention is to provide in connection with a cutter of the class described, a conveyer for carrying off the chopped material and in so arranging this conveyer that the chopped vegetables will be positively directed on to the conveyer and will therefore not collect or clog beneath the same and will not be wasted.

In the accompanying drawings, Figure 1 is a vertical sectional view through a vegetable cutter constructed in accordance with the invention taken in a plane from front to rear. Fig. 2 is a front elevation of the said cutter, and Fig. 3 is a horizontal sectional view on the line 3—3 of Fig. 1, the cutting cylinder being shown in top plan.

As shown in the drawings, the cutter mechanism embodying my invention is mounted in a suitable frame which is indicated in general by the reference character A, and the operating mechanism thereof is A, and the operating mechanism thereof is inclosed in a suitable casing including side walls 5, a vertical rear wall 6, an inclined front wall 7, and a top wall 8 which is a continuation of the rear wall 6 and extends at its forward end forwardly above the front wall 7, the upper edge of the said front wall 7, terminating short of the said top wall 8 so as to provide an opening 9 through which the vegetables to be cut may be introduced into the casing.

An elevator or conveyer casing 10 extends rearwardly upwardly at an angle from the lower end of the casing above described and mounted for travel in the said casing 10 is an endless belt conveyer 11 which is trained over rollers, only one of the rollers being shown and being indicated by the numeral 12, this roller being journaled for rotation within the main casing at the lower end thereof.

A deflector member in the form of a transverse cleat 13 is fixed upon the inclined front wall 7 of the main casing of the cutter and the upper face of this cleat is inclined as clearly shown in Fig. 1 of the drawings so as to direct the cut material on to the upper stretch of the conveyer apron 11, the object of such a construction being to obviate waste of the cut material and to prevent clogging of the same beneath the conveyer.

The cutting mechanism of the invention consists, broadly speaking, of a stationary slotted bar and rotating cutters which pass through the slots in the stationary bar which is indicated by the numeral 14, the slots being indicated at 15, the said strip being secured to the inner face of the said inclined front wall 7 of the casing and projecting at an angle from the said wall of the casing, inwardly.

Journaled in suitable bearings 16 upon the frame A and extending at its ends through the side walls 5 of the main casing of the device is a shaft 17, and the shaft carries a roller 18. Secured upon the shaft 17 at each end of the roller 18 is a circular head 19 and secured at their ends to the peripheries of the heads are knives 20 which are equi-distantly spaced around the circumference of the open cylinder. The cutting edges of the knives 20 are presented in the direction of rotation of the cylinder and are so arranged as to pass closely to the edge of the bar 14 and at right angles with respect thereto. Secured upon each of the knives 20 and projecting at right angles therefrom and radially from the cylinder are several knives 22. The cylinder above described rotates in the direction of the arrow shown in Fig. 1 of the drawings, and the cutting edges of the blades 22 are presented in the direction of rotation of the cylinder. The bar 14 extends with its upper face in a horizontal plane substantially coincident with the axis of the cylinder carrying the knives 22 and as the cutting edges of the blades 22 are radial with respect to the cylinder and the bar 14 is located as above described, the cutting edges of the blades, as they pass through the slots in the blades 14, will be substantially parallel.

As clearly shown in Fig. 2 of the drawings, the blades 22 are so arranged or positioned upon the cylinder by which they are carried that they will pass, during the rotation of the cylinder, each between two of the blades 14.

In operation, vegetables such as pumpkins or the like are fed into the casing through the opening 9 in the front thereof and are forced by the blades 22 down against the blades 14, the two sets of blades coöperating to chop the vegetables into pieces of substantially uniform size and shape.

In order that the cylinder may be driven rapidly so as to effectually perform the chopping operation, a pulley 23 is fixed upon the shaft 17 at one end thereof and is designed for the attachment of a drive belt (not shown).

What is claimed is:—

In a machine of the class described a casing provided in one wall with an opening for the introduction of material, a shaft journaled in the casing near the said opening, a roller upon the shaft, a head fixed at each end of the roller, a bar fixed upon the said wall of the casing below the opening therein and in a plane with the shaft, the inner edge of the bar being nearly in contact with the peripheries of the heads, knives fixed at their ends to the peripheries of the heads with their cutting edges presented in the direction of rotation of the heads, said knives having a shearing coöperation with the inner edge of said bar, said bar being formed with slits extending from its said inner edge, and blades upon each of the knives extending at right angles thereto and arranged for passage through the slits in the said bar, the cutting edges of the knives being in advance of the cutting edges of the blades carried thereby, and the bars being of a width substantially equal to the distance between its free inner edge and the said roller upon the shaft, the said knives being so spaced from the surface of the said roller as to permit of the cut material falling between the knives and the roller and into the casing.

In testimony that I claim the foregoing as my own, I have hereto affixed my signature in the presence of two witnesses.

ALBERT E. McGREW.

Witnesses:
WADE BAILEY,
R. K. BRADFIELD.